June 16, 1942.   T. P. SIMPSON ET AL   2,286,654
METHOD FOR HEAT TREATMENT FOR SOLID PARTICLES
Filed Feb. 28, 1940
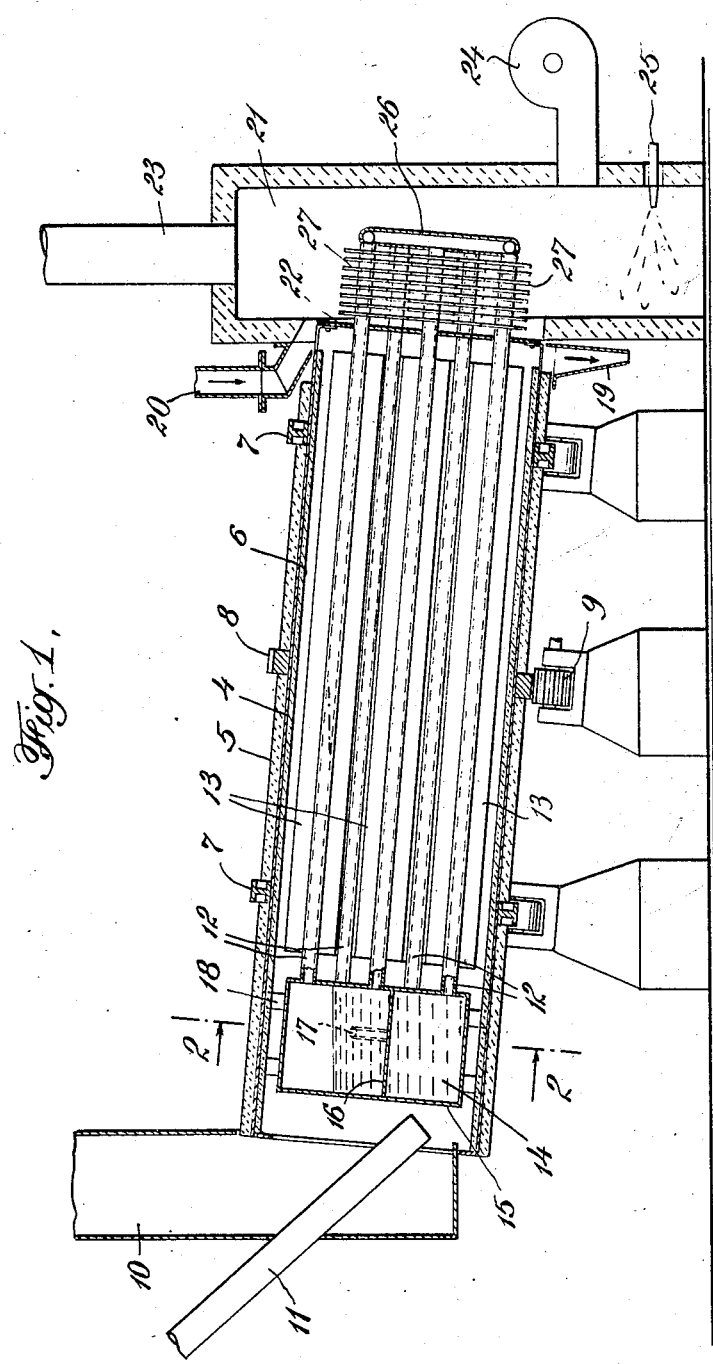
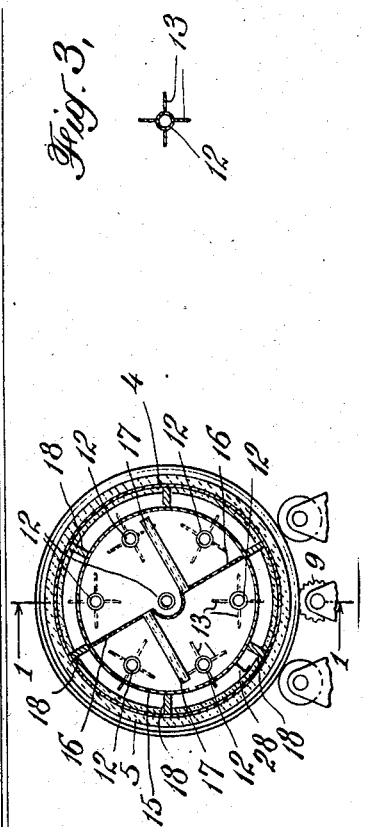
Thomas P. Simpson,
Vladimir A. Kalichevsky
and John W. Payne
INVENTORS
BY
ATTORNEY

UNITED STATES PATENT OFFICE 2,286,654

METHOD FOR HEAT TREATMENT FOR SOLID PARTICLES

Thomas P. Simpson, Vladimir A. Kalichevsky, and John W. Payne, Woodbury, N. J., assignors to Socony-Vacuum Oil Company, Incorporated, New York, N. Y., a corporation of New York Application February 28, 1940, Serial No. 321,185

4 Claims. (Cl. 252—281)

This invention relates to a method of treating solid materials in particle form with gases or vapors, under exothermic or endothermic conditions, at closely controlled temperatures. Such operations are used in the regeneration of spent adsorbent materials, the roasting or calcining of ores, and similar processes. The regeneration or reactivation of spent solid granular adsorbent material, such as fuller's earth used in a decolorizing filtration, as for example on petroleum oils, is typical and presents most of the problems presented by any similar operation.

In regeneration of petroleum filter clays, for instance, as carried out today, the clay suffers a loss in efficiency with each burning or regeneration until finally it cannot be regenerated to a sufficiently high activity to warrant further regeneration, at which time the clay is discarded to waste. Since clays which have had a different number of burnings have different efficiencies, they are usually kept separate and separately classified. In general filter clays are only regenerated about five to eight times and practically never more than ten to fifteen times before they are thrown away.

The problem of regenerating clays is complicated by the sensitivity of the clays to high temperatures. While temperatures around 900°–1150° F. are desired to burn off impurities from the clay, temperatures around 1300° F. may permanently injure the clay. Moreover, if the temperature falls too low, inefficient regeneration results. The problem of keeping the temperature of the clay within safe limits is greatly increased since the combustion reaction involved in burning off the impurities evolves considerable amounts of heat and can very easily become so rapid as to get beyond control temporarily, either generally or locally. Probably one of the principal reasons for the successive losses in activity of regenerated clay is the fact a certain amount is overheated or underheated each treatment. In view of the fact most clays to be regenerated have more than enough carbonaceous material deposited thereon to furnish the heat required for regenerating, it is quite probable that present methods in general permit overheating; this appears to be true, moreover, from the fact it would be extremely difficult to control precisely the temperature of all the clay in present methods and apparatus.

It has been found that considerable increases in efficiency may be achieved by applying accurate temperature control to existing methods and apparatus.

This invention has for an object the provision of a method of and apparatus for treating a moving stream of solid particles at elevated temperatures with accurate temperature control over the solids being treated throughout the period of their treatment.

Another object is the provision of a method of and apparatus for subjecting stream of solid particles to the action of gases or vapors wherein accurate and constant control of an elevated temperature of treatment is utilized to effect a treatment of more uniform degree.

A further object is the provision of a process and apparatus wherein a granular adsorptive material is suitably flowed in contact with and generally countercurrent to an activating gaseous medium while controlled temperature conditions are maintained.

Still another specific object of the invention is to provide a practical method of and apparatus for regenerating a moving stream of spent adsorptive material such as filter clays, catalysts and the like having carbonaceous impurities deposited thereon by reacting said carbonaceous impurities with a gaseous oxidizing medium which method suitably flows the adsorptive material countercurrent to the gaseous medium and controls the temperature of the adsorptive material such that efficient regeneration will be effected without subjecting the material to deleterious temperatures.

Another object is the provision of a method and apparatus capable of accomplishing high unit throughput per unit of capital invested and space occupied.

A further object is the provision of a method and apparatus which permits more efficient utilization of the heat developed in the apparatus. These and other objects will appear from the following description of my invention.

In this present invention, moving, particle form solids are treated with flowing gaseous agents, under closely controlled conditions of elevated temperature, by passing them countercurrently to the gases through a treating zone wherein repeated contact of the solids and gases are accomplished and wherein every particle of solid is repeatedly brought into contact with temperature control means and is thereby kept within a suitable treating temperature range without being subjected to undesirable temperatures. Provision is made not only for longitudinal flow of the solids through the treating zone, but also for repeated agitation, redistribution and added contact of the solids with the gases, being so arranged that each portion of solids receives a substantially uniform treatment.

As has been indicated above, the present invention may be used in the treatment of finely divided solids in general. Particularly typical of materials that may be treated by our invention are those spent filter clays and adsorbents derived from the filtration of mineral oil products such as waxes, turbine and transformer oils and particularly the usual lubricating oils; also from the filtration of vegetable oils; sugar liquors; etc. These spent clays or other adsorbents contain adsorbed combustible materials such as tarry, oily or carbonaceous matters and are regenerated for re-use by the heating or burning of the carbonaceous material adsorbed thereon. In some instances it may be desirable to burn off only inactive carbonaceous impurities while carbonizing a part of the carbonaceous impurities to form an active carbon layer on the adsorbent.

Other typical materials which we may treat are solid particles of catalytic materials which have been used in some catalytic process of refining or conversion until sufficiently contaminated with impurities that regeneration or revivification is required or desirable and wherein the inactive impurities deposited on the catalyst are removed by treating the catalytic material at elevated temperatures. For instance, in the catalytic cracking of petroleum oils using a finely divided solid catalyst material, e. g., clay-type catalysts, the catalyst becomes contaminated with a carbonaceous deposit of the nature of coke which must be removed from time to time in order to regenerate the catalyst, and this removal is usually effected by burning off the impurities at closely controlled elevated temperatures.

For convenience the present invention will be described in detail with respect to regeneration of spent petroleum filter clay. However, it is to be understood the invention is not limited thereto but is directed to the whole field of regeneration of spent adsorbents and catalysts by burning off inactive impurities as well as to the initial preparation of same when necessary including activating, drying, hardening and the like by the application of heat. Likewise the present invention, as has been stated, may be used to advantage for the heat treatment of finely divided solids in general, as, for instance, roasting of ores, showing decided advantages for treatments wherein close temperature control is a necessity or a highly desirable condition and reactions are involved which produce or consume a considerable amount of heat.

In order that the invention may be readily understood, reference is now made to the drawing attached to this specification, wherein Figure 1 is a longitudinal section of an apparatus suitable for the practice of our invention, Figure 2 is a cross section thereof, and Figure 3 is a detail cross section of one element of the apparatus.

The apparatus as shown in Figure 1, consists essentially of a modified rotary kiln. In the diagrammatic longitudinal section of Figure 1, 4 denotes the shell of the rotary kiln, which may be externally covered by an insulating jacket 5 and may be lined with an internal insulating or refractory lining 6. As is usual, the kiln 4 is supported by roll rings 7 and 7, and is rotated through the agency of a gear ring 8 and drive pinion 9. At its upper end, the kiln is provided with the usual stack 10 and feed pipe 11 whereby material to be treated may be introduced into the kiln.

Internally, however, we have modified the kiln by the introduction thereunto of the tube bundle composed of tubes 12, disposed in cross section as shown in Figure 2, for a purpose later discussed. Each tube 12 extends substantially throughout the length of the kiln, and is equipped with extended surface, which may take the form of fins 13, which are more clearly shown in Figures 2 and 3. Each of the tubes 12 is arranged to act as a conduit for a fluid heat exchange medium 14, and the tubes, in one form of construction enter into an internal surge tank 15, placed within and near the inlet end of the kiln. Surge tank 15 is provided internally with a baffle 16, placed at about its midsection and with two vent pipes 17, as shown particularly in Figure 2. The entire assembly of tube bundle and surge tank is affixed to the kiln shell, as indicated at 18—18, and rotates therewith. When the tubes and surge tank are filled with a fluid heat transfer medium to a point above the middle of surge tank 15, and rotated, there is provided a continuous cyclic circulation of the fluid medium through the tubes 12 and the tank 15, assisted by the action of the partition 16 and vents 17.

At the opposite end of the kiln from the surge tank, further modifications are made, while preserving the usual exit for treated solid at 19 and the usual inlet for treating gases at 20. At this end, there is provided a chamber 21, which may be isolated from the interior of the kiln, as by plate 22. Chamber 21 is provided with a stack 23 and may be provided with either a fan 24 or a burner 25 or both. Tubes 12 extend into chamber 21 and are joined in a circular header 26 and throughout their length exposed in 21 are preferably equipped with extended surface in the form of fins 27. It is to be understood, however, that any other feasible construction might be used for providing the heat transfer tubes within the kiln and for circulating a temperature-controlled fluid heat exchange medium through the tubes.

In operation solid material in divided form, such as fuller's earth to be revivified, is fed in at 11 and passes down through the inclined, rotating kiln to exit at 19. While so passing, it encounters and passes countercurrent to treating gas introduced at 20 and departing by the flue 10. Due to the rotation, the solid material not only advances, but is repeatedly carried up the side of the kiln and showered upon the heat transfer tubes 12. If desired, shell baffles, as at 28, (see Figure 2), may be added to assist and enhance this action.

The desired temperature conditions for the reaction are established by means of a fluid heat transfer medium circulated in tubes 12, and adjusted in temperature in chamber 21. If the reaction in kiln 4 evolves too much heat such as certain highly exothermic reactions, heat may be removed by operating fan 24 to cool the heat transfer medium 14 in tubes 12 by extracting heat therefrom by the finned extensions of tubes 12 into chamber 21. If the reaction consumes heat such as certain endothermic reactions, heat may be supplied by burner 25. If, as is more usually the case, the reaction requires addition of heat through a portion of the length of kiln 4 and requires extraction of heat through another portion of the length, the fluid heat transfer medium circulating through tubes 12 will serve to transfer heat, i. e., adding or abstracting, along the length of kiln 4 as needed, leaving only the overall surplus or deficiency adjustment to be performed in chamber 21. Since this method permits the convenient introduction of heat into a rotary kiln without necessitating the introduction of combustion gases thereunto, and since in many instances the reaction conducted may be self supporting from a fuel basis, a separate entry for treating gas is normally provided at 20 and isolating plate 22 is used, although in some cases, as where a reducing atmosphere is desired, it may be provided by removing plate 22, and utilizing chamber 21 as a source of flue gas for treating.

The heat transfer medium in tubes 12 transfers heat to or from the reaction by a combination of radiation and conduction both to the gaseous atmosphere and to the solids which are brought into contact with the tubes 12 and fins 13. Consequently the detailed proportioning of the tubes 12, fins 13, and fins 27 may vary widely for different purposes.

The heat exchange tubes should, however, be so arranged that efficient contacting with solid undergoing treatment can be had, and to this end a peripheral position may be preferred, since tubes placed near the interior wall of the kiln will be buried at least partially when at the bottom of the kiln and will be showered with solid as they rise. Further, the arrangement of fins, if used, can be such as to promote contact of this nature as well as to further heat transfer between the heat transfer medium and the gases.

Further, the amount of heat transfer surface, the temperature of the heat transfer medium, and the rate of circulation of the heat transfer medium should be such that desired conditions can be maintained. For example, upon materials of the nature of contaminated fuller's earth from petroleum filtration, or contaminated clay-like catalyst particles, both of which must be at or above about 800° F. to burn and both of which are usually damaged by temperatures much above 1200° F., the rate of heat removal should be such as to permit removal of carbonaceous matter at rates ranging from about 1% to about 10% of carbon (based upon weight of clay fed per hour) with probable preferred ranges of operation being around 3% to 6% of carbon per hour, while not permitting rise of clay temperature above about 1100° F.

An important feature of the present invention is the proper use of fluid heat exchange medium and the structure whereby the solids are intimately contacted with counterflowing gases while each individual particle of the solids, during substantially the entire duration of the reaction, is within close proximity to the heat exchange medium so that no deleterious temperature condition is created.

In order to obtain proper temperature control, the heat exchange medium must be adjusted to a proper temperature, for extracting or adding the necessary heat. Moreover, heat exchange medium must be flowed in sufficient amount in close indirect heat exchange with every solid particle and then cooled or heated to readjust its temperature by means extraneous of the reaction heat before the medium's temperature reaches an undesired value. In this way the heat exchange medium in our invention continuously controls the temperature of the zone making immediate compensations for temperature changes whereby no deleterious temperatures occur.

When the operation is first started the heat exchange medium may add some heat to help initiate the reaction or treatment, or at least the medium should not be at such a low temperature as to substantially hinder such initiation. After the operation is started the exchange medium is circulated throughout the zone adding or abstracting heat as required. In our invention the heat exchange medium is maintained at all points in the regenerating zone at a temperature below temperatures which cause substantial damage to the clay (or if other operations are being conducted, below temperatures which cause heat damage thereto), and, of course, at a temperature above which undue cooling occurs so that the regeneration (or other treatment) cannot proceed efficiently. For instance, in the usual regeneration of filter clays and the like we preferably maintain the heat exchange medium at a temperature around 850°–900° F. and never above about 1050° F. By so controlling the heat exchange medium and flowing a sufficient amount within sufficiently close indirect heat exchange with each particle, a close uniform temperature control is maintained over every particle so that no deleterious temperatures occur which cause injury to the particles or treating operation. Moreover, the entire zone will be maintained under the same close uniform conditions.

While temperature-controlled, circulating gaseous heat exchange mediums of high specific heat might be used in some instances, we greatly prefer the use of liquid heat exchange mediums since necessary pumping and pressure facilities for proper use of even the best gaseous mediums, e. g., hydrogen, would, in many instances, render the operation commercially impractical.

The liquid heat exchange medium to be used is preferably one which at the temperatures encountered is possessed of a low vapor pressure, a high specific heat, a suitable viscosity and is not corrosive to the usual metals and other materials which may be used in construction of the apparatus. Many normally solid materials in their fused state form excellent heat exchange mediums such as fused salts and fused metals and alloys. In the regeneration of clay, we prefer the use of fused salts. A particularly preferable mixture of this kind is a mixture of the alkali metal salts of nitric and nitrous acids. In certain cases suitable liquid heat exchange media might be found which have a boiling point around the desired operating temperature, in which case, the heat exchange medium, although mostly in the liquid state, might undergo some transition whereby advantage could be taken of its heat of vaporization or condensation. By the use of liquid heat exchange medium and by having them in sufficiently close proximity to all particles undergoing reaction an extremely close and uniform temperature control may be maintained.

In the preferred practice the heat exchange medium is maintained at substantially the temperature of the treatment being controlled. Such practice may be carried out because the heat exchange medium is a liquid and has a relatively high specific heat and the structure of the apparatus is such that heat exchange medium is brought within close proximity to every granule in the apparatus. Hence considerable fluctuations in temperature in either direction can be compensated by the liquid heat exchange medium without substantially altering its temperature and if the fluctuation is too great suitable cooling or heating of the heat exchange medium in its circuit will still maintain the liquid at the treating temperature. Thus if a sharp brief rise in temperature occurs which normally would damage the clay before it is indicated, if ever, on a temperature responsive device and suitable manipulation effected to offset the rise, in the present method the liquid heat exchange medium would immediately and automatically offset the rise by absorbing any excess heat so that deleterious temperatures would not be created. Likewise if the temperature fell off sharply so that normally the temperature would go so low that inefficient regeneration would result, this fluctuation likewise would be immediately and automatically offset by the liquid heat exchange medium which would add heat to the cooling granules.

As a result of the close uniform temperature control afforded by our invention many important advantages are obtained. For instance, in the regeneration of filter clays the customary loss in efficiency with each regeneration may be substantially reduced or even eliminated. Further, the operation may be substantially changed. In customary practice great excesses of air over the theoretical amount required for combustion are used in order to afford cooling. As a consequence the combustion is not conducted as efficiently as an exothermic reaction might be and generally additional fuel must be added to the clay. Since we have close uniform control over the apparatus the amount of excess air used may be substantially reduced or eliminated whereby the expense of added fuel is correspondingly reduced and further the heat exchange medium may even extract heat rather than add heat.

As will be obvious from the above description, the operation of the regeneration process is controlled by regulating, in connection with the rate of flow of the adsorbent, first, quantity of air used and, second, the temperature and rate of circulation of the heat transfer medium through the heat transfer tubes.

An important feature of this invention is the ability to obtain accurate temperature control. That accurate temperature control is of importance is readily proven by the fact that spent petroleum filter clay when treated under conditions usual in the art must be discarded after about five burns, while, if treated under proper and accurate temperature control, it is substantially unimpaired in filtration efficiency even after 15 to 20 regenerations.

Since one may now dispense with the enormous quantities of excess air normally used for the usual inaccurate temperature control, a more efficient utilization of exothermic heat of regeneration is possible, so much so that most spent filter clays will be found to contain enough combustibles for their own regeneration without burning added fuel. A particular advantage of this invention is that a considerable increase in capacity over the usual rotary kiln may be attained. In fact, it appears that with some materials, much better operation may be attained with throughput rates leading to what would normally be considered a "flooded" condition.

Many departures may be made from the construction shown diagrammatically herein without departing from the spirit of our invention. For example, the chamber 21 may be formed as an extension of the shell 4 instead of separately as shown. Other arrangements of tubing may be used, with the surge tank inside or outside of the shell 4. Or the surge tank may be dispensed with and circulation afforded by means of a pump. Or in another form, the tube bundle need not be rotated with and supported by the shell 4, but may be independently supported and stationary, extending into shell 4. However, all of these obviously provide in one form or another, a tube bundle transversing the reaction space, wherein a fluid heat transfer medium may be circulated to control temperature condition in that reaction space, and we deem all such to be within the confines of our invention.

Throughout this specification and in the claims, the terms solid particles, solids, solid materials, etc., where applicable, mean not only the solid but also any other solid or liquid matter that may be associated therewith, as, for example, the carbon and oil associated with a spent filter clay which is undergoing treatment.

We claim:

1. In a method of reacting solid particle material with a gaseous oxidizing agent, wherein the solid material is flowed downwardly through an inclined oxidizing zone while the gaseous agent is flowed upwardly through the zone in direct contact with the particles under oxidizing conditions, and wherein the solid material is continuously mechanically agitated by continually rotating the said zone, the improvement which comprises maintaining the temperature of all the particles in said zone within the temperature range between the minimum oxidizing temperature and the maximum oxidizing temperature that does not cause substantial heat damage, said temperature range being maintained by circulating a liquid heat exchange medium through the interior of said rotating zone in close indirect heat exchange relationship with all the particles in said zone while maintaining the temperature of said heat exchange medium substantially within said temperature range whereby heat immediately may be added to or extracted from said particles as becomes necessary during operation.

2. In a method of regenerating spent absorbent particles such as clay and the like which are carrying combustible impurities by burning off the impurities with air, wherein the particles are flowed downwardly through an inclined combustion zone while the air is flowed upwardly through the zone in direct contact with the particles under combustion conditions, and wherein the particles are continuously mechanically agitated by continually rotating the said zone, the improvement which comprises maintaining the temperature of all the particles in said zone within the temperature range between the minimum combustion temperature and the maximum combustion temperature for said impurities that does not cause substantial heat damage to said particles, said temperature range being maintained by circulating a liquid heat exchange medium through the interior of said rotating zone in close indirect heat exchange relationship with all the particles in said zone while maintaining the temperature of said heat exchange medium substantially within said temperature range whereby heat immediately may be added to or extracted from said particles as becomes necessary during operation.

3. The method of claim 2, wherein the spent absorbent particles being regenerated are spent petroleum percolation clays, the liquid heat exchange medium is maintained at a temperature around 850 to 900° F. and the temperature of all the particles in the rotating zone is maintained between said minimum combustion temperature and about 1200° F.

4. The method of claim 2 wherein the spent adsorbent particles are spent adsorbent contact mass particles derived from a petroleum conversion operation, the liquid heat exchange medium is maintained at a temperature around 850° to 900° F. and the temperature of all the particles in the rotating zone is maintained between said minimum combustion temperature and about 1200° F.

THOMAS P. SIMPSON.
VLADIMIR A. KALICHEVSKY.
JOHN W. PAYNE.